US011511439B2

United States Patent
Han et al.

(10) Patent No.: US 11,511,439 B2
(45) Date of Patent: Nov. 29, 2022

(54) METHOD FOR MANAGING MODULAR ROBOT AND ROBOT THEREOF

(71) Applicant: LG ELECTRONICS INC., Seoul (KR)

(72) Inventors: Seokgyu Han, Seoul (KR); Sungwon Moon, Seoul (KR); Chanhun Sung, Seoul (KR); Hyegyung Song, Seoul (KR); Youngwha Yang, Seoul (KR); Byeongtae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 536 days.

(21) Appl. No.: 16/572,854

(22) Filed: Sep. 17, 2019

(65) Prior Publication Data

US 2020/0009741 A1  Jan. 9, 2020

(30) Foreign Application Priority Data

Aug. 13, 2019 (KR) ........................ 10-2019-0098789

(51) Int. Cl.
*G05B 15/00* (2006.01)
*G05B 19/00* (2006.01)
*B25J 13/00* (2006.01)

(52) U.S. Cl.
CPC ... *B25J 13/006* (2013.01); *G05B 2219/50391* (2013.01)

(58) Field of Classification Search
CPC .......... G05B 2219/50391; B25J 13/006; B25J 13/06; B25J 19/007; B25J 9/08
See application file for complete search history.

(56) References Cited

U.S. PATENT DOCUMENTS

| 2014/0305076 A1* | 10/2014 | Winzinger | .......... B29C 49/4252 53/201 |
| 2015/0224650 A1* | 8/2015 | Xu | .......... B25J 9/1692 414/730 |
| 2018/0024536 A1* | 1/2018 | Yoneda | .................. H01L 22/34 438/14 |
| 2019/0176049 A1* | 6/2019 | Isozu | ..................... G06F 11/36 |

* cited by examiner

*Primary Examiner* — Harry Y Oh
(74) *Attorney, Agent, or Firm* — Ked & Associates, LLP

(57) ABSTRACT

Provided is a method for managing a modular robot, including at least one module, using a user terminal, the method including: acquiring mount information on the at least one module mounted to the modular robot; receiving module information on a module corresponding to the mount information; and displaying at least one of the mount information and the module information. Also, provided are a user terminal for performing the method for managing a modular robot may be provided, and a non-volatile computer readable recording medium in which a computer program for performing the method for managing a modular robot.

20 Claims, 13 Drawing Sheets

METHOD FOR MANAGING MODULAR ROBOT AND ROBOT THEREOF

CROSS-REFERENCE TO RELATED APPLICATION

This application claims the benefit of Korean Patent Application No. 10-2019-0098789, filed on Aug. 13, 2019, in the Korean Intellectual Property Office, the disclosure of which is incorporated herein in its entirety by reference.

BACKGROUND OF THE INVENTION

Field of the Invention

The present disclosure relates to a method for managing a modular robot configured as one module, and a terminal device thereof.

Related Art

Robots have been made and developed as industrial robots for the medical industry, the aerospace industry, the shipbuilding industry, the agricultural industry and the like. Robot control and manufacturing technologies have been further developed to an extent where domestic robots have been recently produced so that users can do specific household chores using the robots. As such, the robots are widely used in various forms.

As more and more industries and fields employ robots, more and more robots are made to perform various functions. These robots may be robots specialized in performing specific functions required for the respective industries and fields. Such robots designed for the corresponding functions may perform those functions and may be maintained and repaired.

SUMMARY OF THE INVENTION

A robot designed to perform a function required for a corresponding fields is a robot capable of performing only the corresponding function, and it may be difficult to add additional functions. Further, for ordinary people having no expertise, it is difficult to manage a modular robot, which is embodied as a robot by assembling modules capable of respectively performing a specific function, to perform various functions.

The present disclosure is to provide a method and a terminal device, by which a user is allowed to easily manage a modular robot embodied by assembling modules capable of performing specific functions, respectively.

According to an embodiment, in order to address the above-described technical object, there may be provided a method for managing a modular robot, including at least one module, using a user terminal, the method including: acquiring mount information on the at least one module mounted to the modular robot; receiving module information on a module corresponding to the mount information; and displaying at least one of the mount information and the module information.

According to an embodiment, in order to address the above-described technical object, there may be provided a user terminal for managing a modular robot including at least one module, including: a communication unit; a display; and a processor configured to acquire mount information on the at least one module mounted to the modular robot, control the communication unit to receive module information on a module corresponding to the mount information, and control the display to display at least one of the mount information and the module information.

According to an embodiment, in order to address the above-described technical object, there may be provided a non-volatile computer readable recording medium in which a computer program for performing a method for managing a modular robot is recorded.

According to various embodiments of the present disclosure, a modular robot including at least one module can be managed easily and intuitively by a user.

DESCRIPTION OF EXEMPLARY EMBODIMENTS

Figure 1:
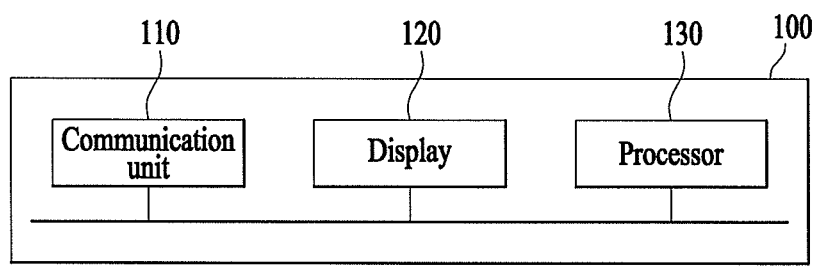
FIG. 1 shows a block diagram of a user terminal capable of implementing a method for managing a modular robot according to an embodiment.

Hereinafter, example embodiments of the present disclosure will be described in detail with reference to the drawings so that those skilled in the art can easily carry out the present disclosure. The present disclosure may be embodied in many different forms and is not limited to the embodiments described herein.

With respect to constituent elements used in the following description, suffixes "module" and "unit" are given or mingled with each other only in consideration of ease in the preparation of the specification, and do not have or serve as different meanings.

In order to clearly describe the present disclosure, elements having no connection with the description are omitted, and the same or extremely similar elements are designated by the same reference numerals throughout the specification. In addition, some embodiments of the present disclosure will be described in detail with reference to exemplary drawings. When adding reference numerals to constituent elements of the respective drawings, it should be noted that the same or similar elements are denoted by the same reference numerals even though they are depicted in different drawings. In addition, in the following description of the present disclosure, a detailed description of known functions and configurations incorporated herein will be omitted when it may make the subject matter of the present disclosure rather unclear.

In addition, it will be understood that the terms first, second, A, B, (a), and (b), for example, may be used herein to describe various elements according to the embodiments of the present disclosure. These terms are only used to distinguish one element from another element and, thus, are not intended to limit the essence, order, sequence, or number of elements. It will be understood that, when any element is referred to as being "connected to" "coupled to", or "joined to" another element, it may be directly on, connected to or coupled to the other element or intervening elements may be present.

It will be further understood that the terms "comprises" "comprising" "includes" and/or "including" when used in this specification, specify the presence of stated features, integers, steps, operations, elements, and/or components, but do not preclude the presence or addition of one or more other features, integers, steps, operations, elements, and/or components.

In addition, for convenience of description, the present disclosure may be embodied by subdividing constituent elements, but these constituent elements may be embodied in a single device or module, or one constituent element may be divided into multiple devices or modules.

Prior to describing example embodiments of the present disclosure, key terms are described below.

The term "modular robot" may be defined as a robot that is driven by assembling at least one modularized physical component. That is, predetermined functions performed by the modular robot may be performed based on each assembled module. According to an embodiment, in order to add a function necessary for the modular robot, a user may add a new module to the modular robot, and, when a function is determined not necessary for the modular robot, a user may remove a corresponding module from the modular robot.

According to an embodiment, a user terminal may register a modular robot, and the user terminal may acquire various types of information about at least one module mount to the registered modular robot and display the acquired various types of information.

According to an embodiment, the modular robot registered in the user terminal may work in conjunction with the user terminal, and accordingly, the modular robot and the user terminal are enabled to communicate with each other. According to an embodiment, the modular robot may include a core module for controlling at least one module attached to the modular robot. The core module may be wirelessly/wiredly connected to other modules to be controlled, and accordingly, the core module may various types of information (e.g., whether a corresponding module is mounted, an amount of power consumption, use of time, whether a corresponding module is on/off, etc.) and perform data processing. The core module of the modular robot may control a communication module mount to the modular robot in order to communicate with an external device, and accordingly the core module may transmit and receive various types of information with the external device. According to an embodiment, the modular robot may include a battery module. According to an embodiment, the core module of the modular robot may control power provided to at least one mounted module.

The term "mount information" includes information on various modules mount to a modular robot according to an embodiment. According to an embodiment, the mount information may include a type of a mounted module, and the type of the module may be classified by various standards. Thus, the mount information may include information indicating a type of a module, such as a camera, a display, a wheel, a support member, a motor, any of various sensors, a speaker, etc. By acquiring the mount information, the user terminal may display a type of a mounted module.

The term "module information" may include detailed information on a module mount to a modular robot. That is, as detailed information of a module corresponding to mount information, the module information may be displayed along with mount information. Thus, according to an embodiment, in a case where a mounted module is replaced with a module having a better specification, the mount information is not changed and module information may be changed alone and displayed.

The term "module combination information" may be defined as a combination of modules allowed to be mount to a modular robot according to an embodiment. According to an embodiment, the module combination information may be predetermined. According to an embodiment, the module combination information may be shared by another user. According to an embodiment, the module combination information may include module information on each module. According to an embodiment, upon receiving the module combination information, a user terminal may compare at least one module mounted to a registered modular robot with the module combination information.

The term "Artificial Intelligence (A. I.)" refers to artificial intelligence or a field for studying a methodology therefor. The term "machine learning" refers to a field for defining various problems addressed in the AI field and studying a methodology for solving the problems. The machine learning may be defined as an algorithm that constantly performs a specific task and thus improves performance with respect to the specific task.

The term "artificial neural network (ANN)" may include an input layer, an output layer, and selectively one or more hidden layers. Each layer includes one or more neurons, and the artificial neural network may include a synapse that connects one neuron and another neuron. In an artificial neural network, each neuron may output a function value with respect to input signals, a weight, and a deviation which are input through a synapse.

Artificial Intelligence may refer to overall models used in machine learning and having problem solving capabilities, each model which consists of artificial neurons (nodes) that forms a network through synapse connection. The artificial neural network may be defined a connection pattern between neurons on different layers, by a learning procedure of updating a model parameter, and by an activation function of generating an output value.

The model parameter refers to a parameter determined through learning, and may include a weight of synapse connection, a deviation of neurons, etc. In addition, a hyper parameter refers to a parameter that needs to be set before learning by a machine learning algorithm, and may include a learning rate, a reputation number, a mini-batch size, an initialization function, etc.

The purpose of learning of the artificial neural network may be determining a model parameter that minimizes a loss function. The loss function may be used as an index for determining an optimal model parameter for a learning process in the artificial neural network.

The machine learning may be classified into supervised learning, unsupervised learning, and reinforcement learning.

The map learning refers to a method for training an artificial neural network with a given label for training data, and the label may refer to an answer (or a result value) which the artificial neural network needs to infer when the training data is input to the artificial neural network. The unsupervised learning may refer to a method for training an artificial neural network without a given label for training data. The reinforcement learning may refer to a learning method that enables an agent, defined in a certain environment, to select an action or an order of actions so as to maximize accumulative rewards in each state.

Machine learning implemented as a Deep Neural Network (DNN) including a plurality of hidden layers among artificial neural networks may be referred to as deep learning, and the deep learning is a part of machine learning. Hereinafter, the meaning of the machine learning includes the deep learning.

The term "self-driving" or "autonomous-driving" refers to a technology of driving autonomously, and a self-driving or autonomous-driving vehicle refers to a vehicle capable of driving without a user's manipulation or minimum manipulation.

For example, self-driving may include a technology of maintaining the currently drive lane, a technology of automatically controlling a speed, such as adaptive cruise control, a technology of automatically driving along a predetermined path, a technology of automatically set a path when a destination is set, etc.

A vehicle may encompasses a vehicle having only an internal combustion engine, a hybrid vehicle having both an internal combustion engine and an electric motor, and an electric vehicle having only an electric motor, and may include not just a passenger car but also a train, a motorcycle, etc.

In this case, the self-driving vehicle may be regarded a robot having a self-driving function.

The term "eXtended Reality (XR)" is the generic term that refers to Virtual Reality (VR), Augmented Reality (AR), and Mixed Reality (MR). VR technology provides a real-world object or background only as a CG image, AR technology provides a virtually created CG image over a real-world object image, and MR technology is a computer graphic technology for mixing and combining virtual objects in real world.

The MR technology is similar to the AR technology in that a real-world object and a virtual object are displayed together. Yet, the MR technology is different from the AR technology in that a virtual object and a real-world object are used with equal characteristics in the MR technology, whilst a virtual object is used to supplement a real-world object in the AR technology.

The XR technology may apply to a Head-Mount Display (HMD), a Head-Up Display (HUD), a mobile phone, a tablet PC, a laptop computer, a desktop computer, a TV, a digital signage, etc., and a device with the XR technology applied may be referred to as an XR device.

Hereinafter, various embodiments of the present disclosure will be described with reference to the accompanying drawings.

FIG. 1 is a block diagram of a user terminal 100 capable of performing a method for managing a modular robot according to an embodiment. According to an embodiment, the user terminal 100 may include a communication unit 110 capable of transmitting and receiving various types of information with an external device, a display 120 capable of displaying predetermined information, and a processor 130 capable of controlling the communication unit 110 and the display 120. According to an embodiment, the processor 130 may acquire mount information on at least one module mounted to the modular robot, may control the communication unit 110 to receive module information on a module corresponding to the mount information, and may control the display 120 to display the mount information and the module information. Accordingly, the user may be provided with various types of information on the module mounted to the modular robot through the display 120, and thereby enabled to manage the modular robot efficiently based on the received information. According to an embodiment, the communication unit 110 includes a hardware component such as a transceiver, a communication interface, etc. A method for using a modular robot using the user terminal 100 will be described later on with reference to various embodiments.

Figure 2:
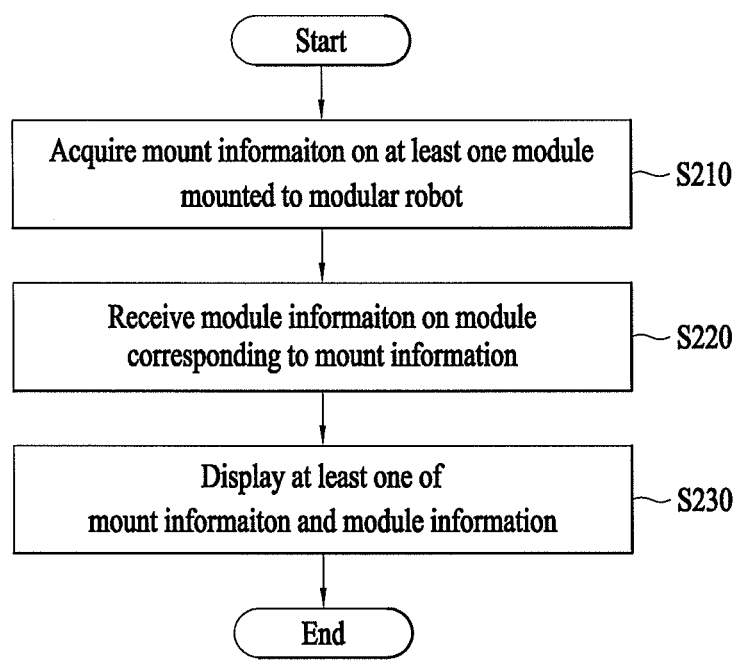
FIG. 2 shows a flowchart of a method for managing a modular robot according to an embodiment.

FIG. 2 shows a flowchart of a method for managing a modular robot according to an embodiment.

In step S210, the user terminal 100 may acquire mount information on at least one module mounted to a modular robot according to an embodiment. According to an embodiment, the modular robot may determine which module is mounted, based on information acquired from a connected module, and the user terminal 100 may acquire mount information on the mounted module from the modular robot.

According to an embodiment, the user terminal 100 may receive the mount information from the modular robot or may acquire the mount information on at least one module mounted to the modular robot in any of other methods. According to an embodiment, the user terminal 100 may identify each mounted module by photographing at least one of a barcode or a QR code attached to at least one modular robot, and may acquire installation information based on the identification of each module. According to another embodiment, using an image analytic function of automatically performing identification on an image of the modular robot, the user terminal 100 may acquire information on a module mounted to the modular robot. Selectively, the user terminal 100 may modify the acquired mount information based on an external input.

In step S220, the user terminal 100 may receive module information on a module corresponding to mount information. According to an embodiment, the user terminal 100 may receive module information from the modular robot through the communication unit 110, and the received module information may be information on a module that is determined to have been mounted to the modular robot based on the mount information. According to an embodiment, the received module information may correspond one-to-one to the mount information acquired in the step S210.

In step S230, the user terminal 100 may display at least one of the mount information and the module information through the display 120. Based on the mount information and the module information displayed on the user terminal 100, a user is allowed to recognize information regarding the modular robot and manage the modular robot through the user terminal 100.

According to an embodiment, the user terminal 100 may receive information on a module state from the modular robot. For example, the user terminal 100 may receive, from the modular robot, information as to whether a module registered in and mounted to the modular robot malfunctions, information as to whether power is interrupted, information as to whether a repair is needed, information as to whether a corresponding module is a newly mounted module, guidance information on a new function which can be performed upon mounting of a module, and any other information from the modular robot, and the user terminal 100 may display the received information.

Figure 3:
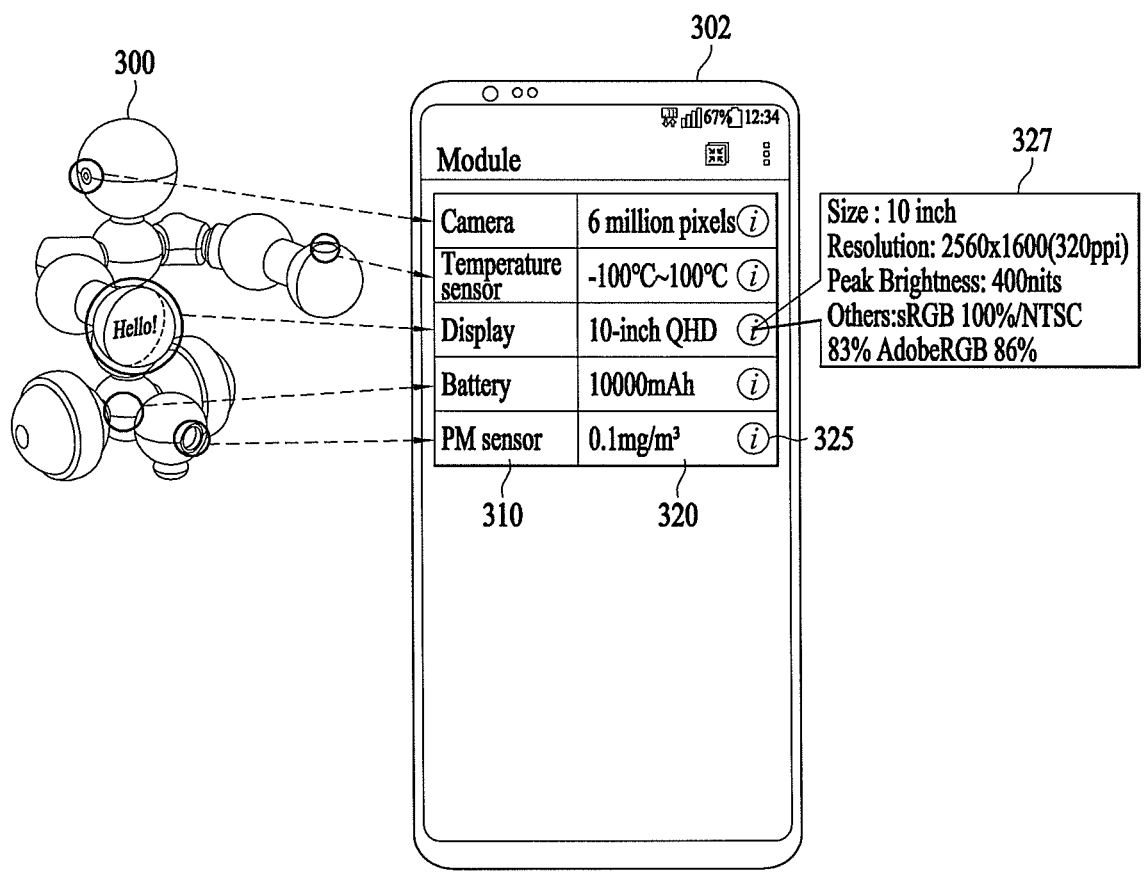
FIG. 3 shows mount information and module information that can be displayed on a user terminal according to an embodiment.

FIG. 3 shows mount information and module information which can be displayed on a user terminal 302 according to an embodiment. The user terminal 302 of FIG. 3 may correspond to the user terminal 100 of FIG. 1.

According to an embodiment, at least one module may be mount to a modular robot 300, and the user terminal 302 may acquire mount information 310 related to a mounted module from the modular robot 300.

According to an embodiment, the mount information 310 may be information indicating a type of a module mounted to the modular robot 300, and, referring to FIG. 3, the modular robot 300 has a camera, a temperature sensor, a display, a battery, and a particulate matter (PM) sensor having mounted thereon, as shown in the displayed mount information 310.

According to an embodiment, module information 320 may be information corresponds to the mount information 310, and the module information 320 may be displayed on the user terminal 302 simultaneously together with the mount information 310. According to an embodiment, the module information 320 may be displayed simultaneously together with the mount information 310, and the module information 320 may be additionally displayed when the mount information 310 is selected.

According to an embodiment, the module information 320 may show detailed information on a module mounted to the modular robot 300. For example, in a case where the mount information 310 indicates that a type of the module is a display, the module information 320 corresponding to the mount information 310 may show detailed specification of the display (e.g., 10-inch Quad High Definition (QHD). According to an embodiment, the user terminal 302 may additionally provide an object 325 for displaying information on the mounted module. According to an embodiment, the object 325 corresponds to the mount information 310, and a different object 325 may be displayed for each mount information 310. According to an embodiment, when the object 325 is selected, the module information 320 corresponding to the mount information 310 may be displayed. According to an embodiment, the mount information 310 and the module information 320 may be displayed simultaneously, and, when the object 325 is selected, further detailed information 327 on a module related to the mount information 310 may be displayed additionally. In this case, the further detailed information 327 including a more variety of data than the module information 320 may be displayed.

Figure 4:
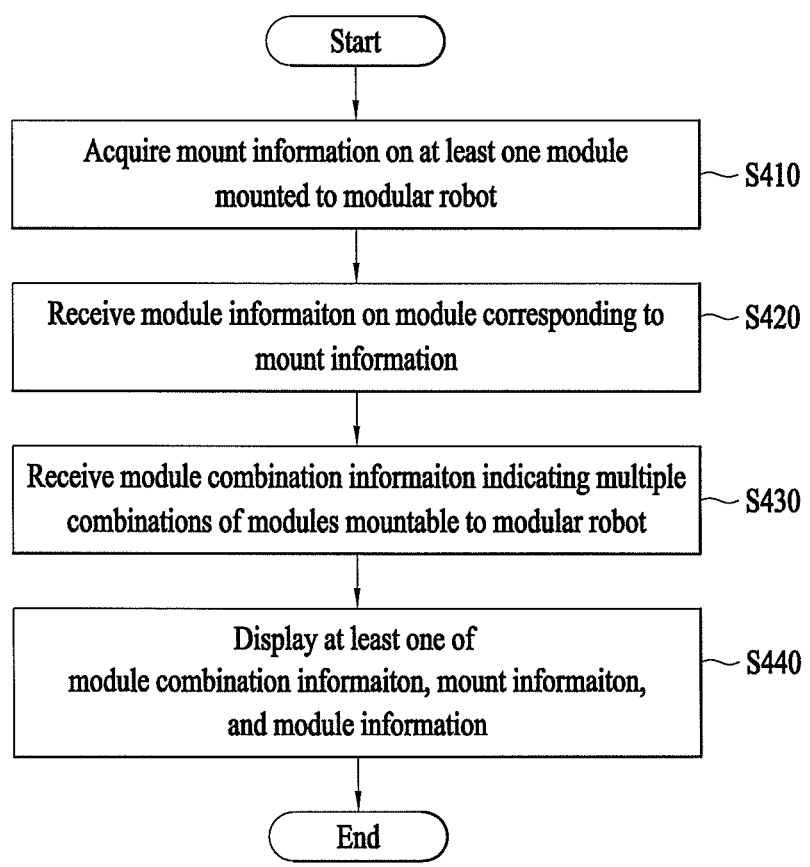
FIG. 4 is a flowchart of a method for managing a modular robot, the method in which module combination information indicating a combination of modules allowed to a modular robot and displayed, according to an embodiment.

FIG. 4 is a flowchart of a method for managing a modular robot that receives module combination information indicative of a combination of modules mountable to a modular robot and displays the received module combination information. Features of steps S410 and S420 may be identical or similar to features of the steps S210 and S220 of FIG. 2, and thus a detailed description thereof is herein omitted.

In step S430, a user terminal 100 may receive module combination indicative of multiple combinations of modules mountable to a modular robot. According to an embodiment, the module combination information may indicate a method for combining modules mountable to the modular robot. That is, users may share information on which modules are to be mounted to the modular robot so that the modular robot can be efficiently used and managed.

According to an embodiment, the module combination information may include mount information and module information on at least one module included in each combination that is included in the module combination information. Mount information included in the module combination information may be information indicating a type of a module required to be mounted to the modular robot. According to an embodiment, the user terminal 100 may compare mount information and module information regarding the modular robot, by receiving mount information and module information included in the module combination information. Based on a result of the comparison, the user terminal 100 may determine which modules are necessary to assemble the modular robot corresponding to one of combinations included in the module combination information.

According to an embodiment, the module combination information may be classified into categories and displayed on the user terminal 100. According to an embodiment, the module combination information may be classified by situations (e.g., home guard, CCTV, learning, cleaning, particulate matter (PM) management, etc.), preferred functions, price, gender, age, etc. and displayed on the user terminal '100, and accordingly, a user may utilize the module combination information to implement a modular robot function optimized for the user.

In step S440, the user terminal 100 may display at least one of the module combination information, the mount information, or module information according to an embodiment. According to an embodiment, the user terminal 100 may display at least one of mount information or module information on a module mounted to a modular robot registered to the user terminal 100, and may further display received module combination information. According to an embodiment, the module combination information may be displayed simultaneously together with at least one of the mount information and the module information, and accordingly, a user is able to directly compare the displayed module combination information and information on a module mounted to the modular robot.

According to an embodiment, by receiving the module combination information, the user terminal 100 may determine how to configure a combination of modules corresponding to the module combination information in a linked modular robot. That is, the user terminal 100 may provide a user with information necessary to change a combination of modules mounted to the modular robot by using information acquired from the modular robot and the received module combination information.

Figure 5:
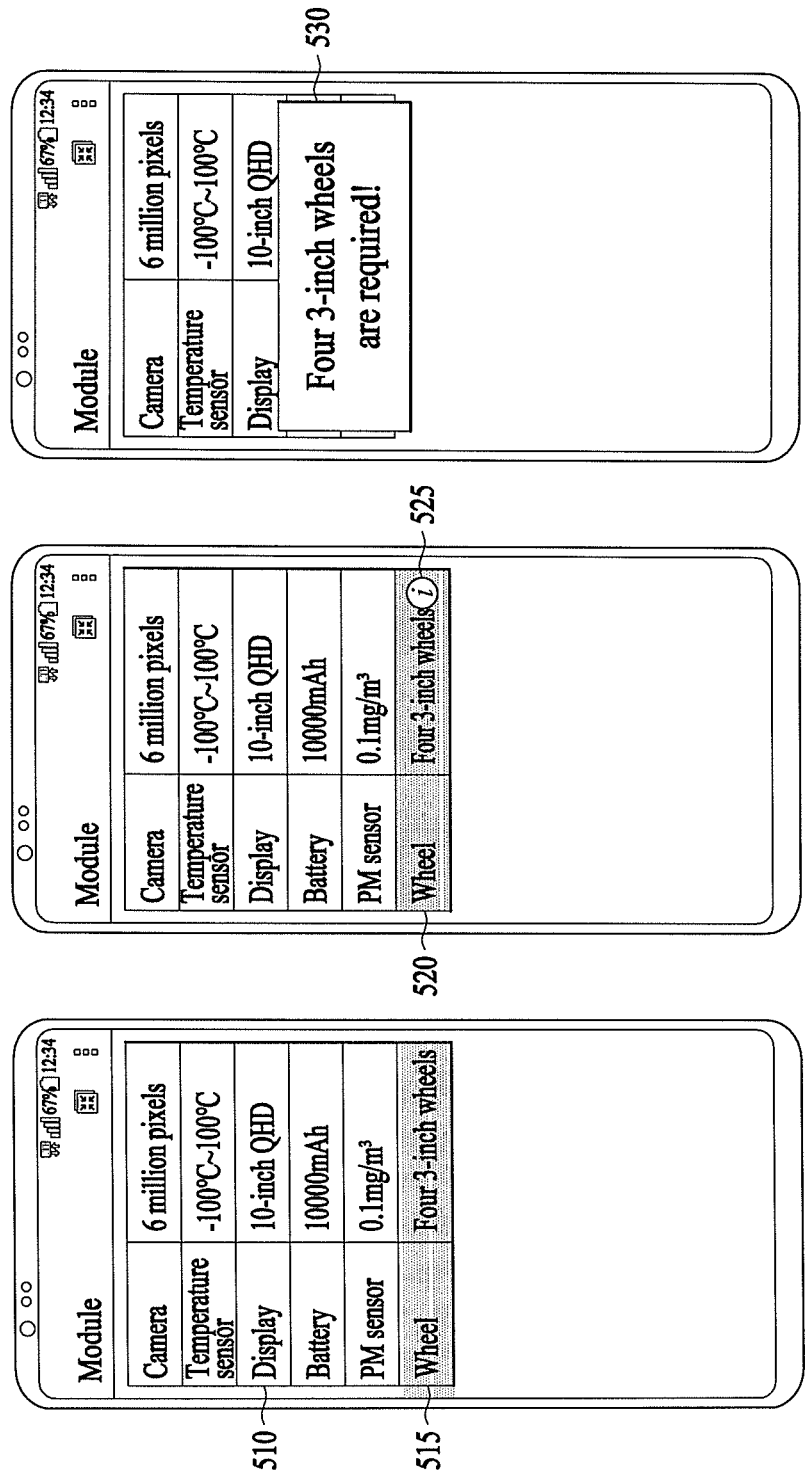
FIG. 5 shows a screen displayed on a user terminal, the screen which where which module is now necessary for a modular robot based on module combination information, according to an embodiment.

FIG. 5 shows a screen where which module is now needed is displayed on a user terminal based on module combination information according to an embodiment.

According to an embodiment, a user terminal 100 may receive module combination information from an outside. The received module combination information may indicate a combination of modules mountable to a modular robot. Referring to FIG. 5, when one of multiple combinations included in the module combination information is selected, the user terminal 100 may display selected module combination information 510.

Referring to FIG. 5, when the module combination information 510 is selected, a combination including a camera, a temperature sensor, a display, a battery, a particulate matter (PM) sensor, and a wheel is displayed. According to an embodiment, when the module combination information 510 is selected, at least one of information on type of modules included in a combination corresponding to the selected module combination information 510 or information indicating detailed specification of the corresponding module may be displayed. For example, referring to FIG. 5, when the selected module combination information 510 is displayed, information indicating that the types of the modules included in the combination are a camera, a temperature sensor, a display, a battery, a particulate matter (PM) sensor, and a wheel may be displayed, and detailed information on each of the modules may be displayed.

According to an embodiment, the user terminal 100 may compare modules mounted to the modular robot and the combination of modules included in the selected module combination information 510. According to an embodiment, a module regarding a wheel 515 may not be mounted among the modules included in the modular robot. According to an embodiment, the user terminal 100 may select one of the multiple combinations included in the module combination information to thereby start a procedure for assembling the modular robot using the selected combination.

According to an embodiment, the user terminal 100 may display at least one of mount information and module information regarding a module included in a current modular robot, and, furthermore, the user terminal 100 may display information (that is, recommended module information) on a module that is recommended to be further added to the modular robot in order to implement the modular robot based on the selected combination. Referring to FIG. 5, in order to display the fact that a module which has not been mounted to the modular robot among modules required to be mounted in accordance with the selected combination is a wheel, recommended module information 520 may be displayed distinguishably from the mount information and the module information. For example, in a case where the mount information and the module information are displayed in a table form, the user terminal 100 may display the recommended module information distinguishably from the mount information and the module information using a font, a color, a shade color, etc.

According to an embodiment, the user terminal 100 may display a first object 525 for differentiate the recommended module information 520 from the mount information and the module information regarding the module mounted to the modular robot.

According to an embodiment, the user terminal 100 may display the recommended information 520 in the form of a pop-up window 530.

Figure 6:
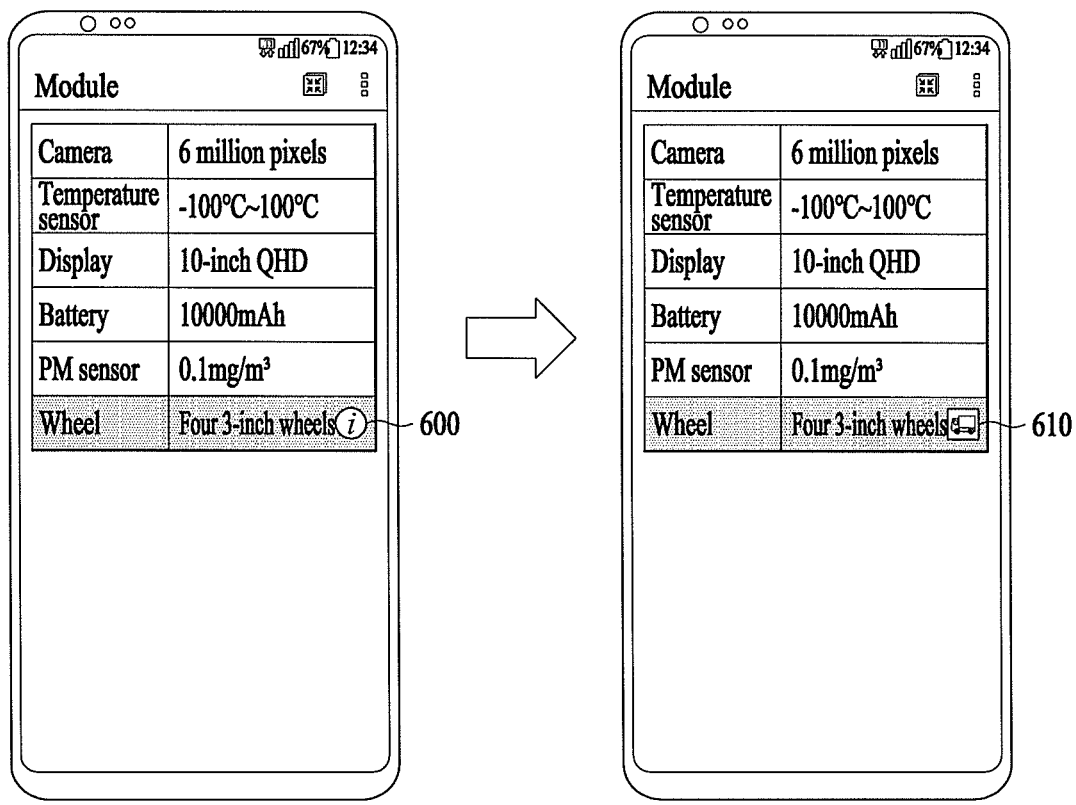
FIG. 6 shows an example in which when a module to be mounted is ordered, the order of the module is displayed on a user terminal according to an embodiment.

FIG. 6 shows an example in which when a module to be mounted is ordered, completion of the order is displayed on the user terminal, according to an embodiment.

According to an embodiment, the user terminal 100 may provide a screen for ordering a module that is recommended to be mounted among modules which have not been mounted to a modular robot. According to an embodiment, the user terminal 100 may display information on the recommended module in a different manner of displaying information on a different module. Referring to FIG. 6, the user terminal 100 may display information on a module already mounted to the modular robot (e.g., a camera, a temperature sensor, a display, a battery, and a particulate matter) and information on the recommended module in different manners.

According to an embodiment, the user terminal 100 may provide a function of displaying a module order screen. According to an embodiment, when information on a recommended module is selected, the user terminal 100 may display a screen where the recommended module can be ordered. Here, the user terminal 100 may display an object using which the information on the recommended module can be selected. Referring to FIG. 6, when a portion regarding a module (that is, a wheel) displayed differently from other modules is selected as an object (for example, through a touch), a screen where the selected module can be ordered. According to an embodiment, the user terminal 100 may display a first object 600 for displaying an order screen regarding to the recommended module. According to an embodiment, when the displayed object 600 is selected, a screen for ordering a module corresponding to the first object 600 may be displayed.

According to an embodiment, the screen where an order can be made may be a screen where a selected type of module can be ordered. The screen where an order can be made may include at least one order link and a relevant image which a user can order. According to an embodiment, as the user terminal 100 executes a preset order link upon selection of a recommended module, a process of selecting an order link by a user is omitted and therefore a simplified order process may be provided to the user.

According to an embodiment, a module recommended to be mounted may be determined based on one of multiple combinations included in module combination information received by the user terminal 100. That is, when one of the multiple combinations included in the module combination information is selected, the user terminal 100 may display recommended module information for recommending a module that has not been mounted to the modular robot among modules included in the selected combination. Here, the recommended module information may correspond to information related to a module regarding which an order screen can be displayed in FIG. 6.

According to an embodiment, when an object for making an order is selected and ordering a recommended module is completed through the user terminal 100, the user terminal 100 may display a second object 610 indicating that the recommended module has been ordered. According to an embodiment, as the second object 610 is displayed, a user may recognize that the recommended module has been already ordered. According to an embodiment, the second object 610 may be displayed in a manner of replacing the first object 600.

Figure 7:
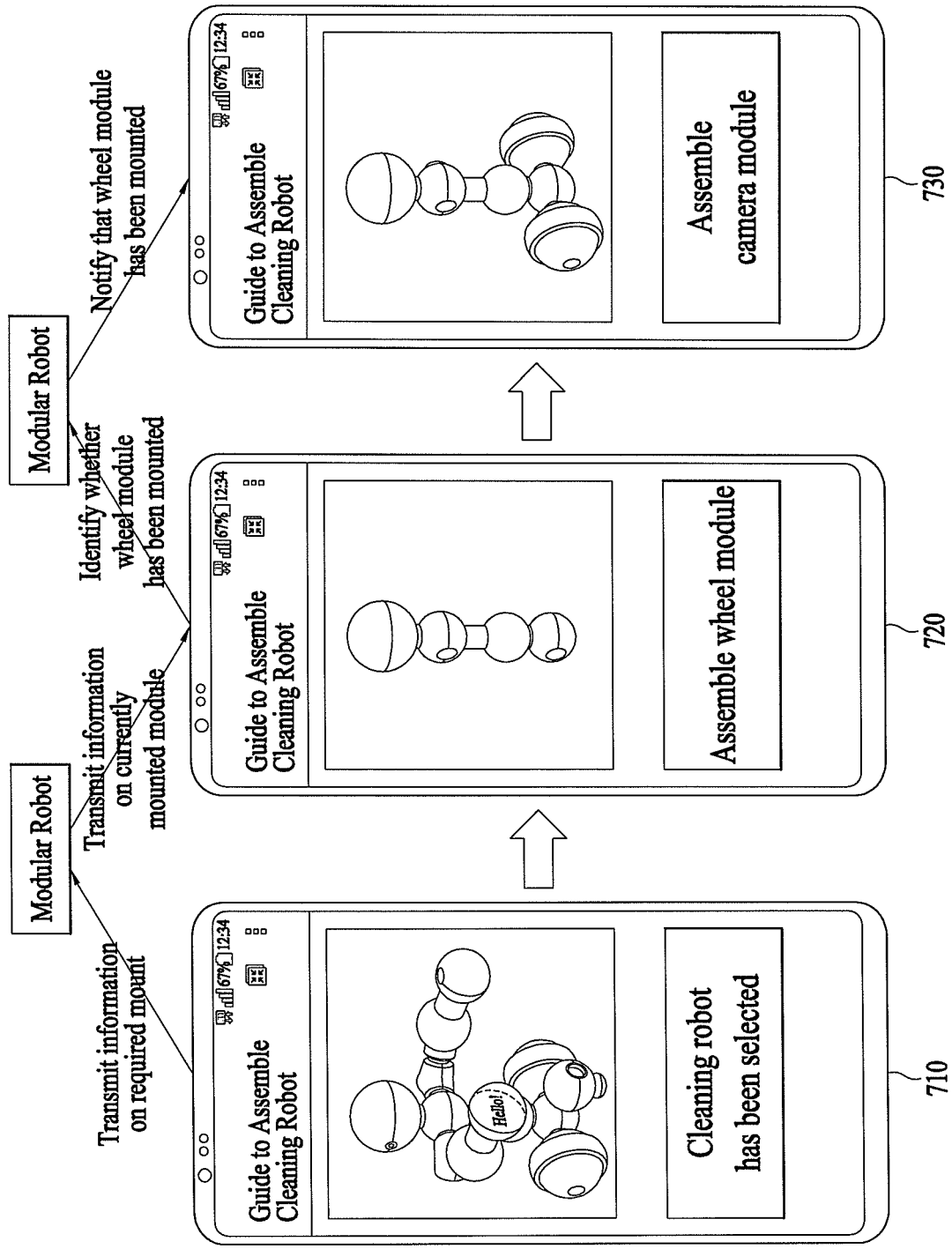
FIG. 7 shows a procedure in which a user terminal and a modular robot communicate with each other in the course of mounting a module to the modular robot based on a module assembling guide displayed on the user terminal according to an embodiment.

FIG. 7 shows a procedure in which a user terminal 100 and a modular robot communicate with each other in the course of mounting a module to the modular robot based on a module assembling guide displayed on the user terminal 100 according to an embodiment. User terminals 710, 720, and 730 shown in FIG. 7 correspond to the user terminal 100 of FIG. 1 and are displayed differently according to a state of the user terminal while communicating with the modular robot.

According to an embodiment, the user terminal 710 may receive module combination information indicating a combination of modules mountable to the modular robot, and display the received module combination information. According to an embodiment, the user terminal 710 may select one of combinations of modules mountable to the modular robot, and display a guide for mounting at least one module corresponding to the selected combination.

Referring to FIG. 7, one of combinations of modules mountable to the modular robot may be selected through the user terminal 710. The user terminal 100 may transmit information on modules necessary to be mounted to the modular robot, and, in this case, information on modules included in the selected combination may be transmitted. According to an embodiment, after receiving the information on the modules necessary to be mounted, the modular robot may transmit information on the currently mounted modules to the user terminal 720 again.

According to an embodiment, the user terminal 720 may receive information on the currently mounted modules from the modular robot, and display information which modules are necessary to be assembled, based on the received information and a guide. According to an embodiment, the guide may include an order of mounting the modules included in the selected combination and a method for. According to an embodiment, the guide may be displayed on the display 120 adaptively to a state of the modular robot based on the information on the currently mounted modules. That is, the guide may include a variety of information regarding an order of mounting all modules included in the selected combination and a method for: however, a guide may be omitted regarding a module that is not necessary to be provided to a user based on information on modules which have been already mounted to the modular robot.

According to an embodiment, based on the information on the currently mounted modules, the user terminal 720 may display a guide for mounting a module necessary to be mounted in the modular robot (e.g., referring to FIG. 7, when it is determined to mount a wheel, a guide saying "Assemble a wheel module" is displayed). According to an embodiment, after the guide is displayed, the user terminal 720 may identify whether the module is mounted according to the guide displayed on the modular robot. According to an embodiment, the modular robot may transmit, to the user terminal 730, information indicating that the module (e.g., a wheel in FIG. 7) regarding which the guide is displayed is mounted. According to an embodiment, after receiving information indicating that a predetermined module is mounted, the user terminal 730 may display information on a next module (e.g., a camera in FIG. 7) according to the guide.

According to an embodiment, the user terminal 100 may display which module has not been mounted in the modular robot based on at least one of mount information and module information regarding the modular robot, and may selectively display a guide regarding a method of mounting a not-mounted module that is selected based on an external input.

According to an embodiment, the user terminal 100 may control the guide displayed based on an external input (e.g., click, tab, flickering, drag, etc.) received from an input unit (not shown). According to an embodiment, in accordance with the external input, the user terminal 100 may display a guide regarding a module to be mounted after or before a module regarding which a mounting method is currently displayed.

According to an embodiment, the user terminal 100 may acquire information on a use pattern of a module mounted in the modular robot from the modular robot. According to an embodiment, a processor 130 of the user terminal may analyze a use pattern of a module based on acquired information on a use pattern (e.g., frequency of use of each module, use intensity, use time, a combination of modules used together, etc.), and accordingly, the user terminal 100 may analyze which modules are frequently used in a combination.

According to an embodiment, the processor 130 of the user terminal 100 may analyze which module is required to be replaced based on a use pattern of a module mounted to the modular robot. For example, when it is determined that performance of a predetermined module included in the modular robot needs to improve based on a use pattern of the predetermined module, information on the module required to be replaced may be displayed. Accordingly, replacement of a module may be to upgrade performance of the module or to remove the module.

According to an embodiment, the user terminal 100 may acquire information on a use pattern in a manner in which the information on the use pattern is discriminated with respect to each type of at least one module in a distinctive manner. That is, the use pattern may be analyzed based on different information for each type of module.

According to an embodiment, regarding a processor module included in modular robot, when it is determined that the processor is required to be replaced by considering an amount of computation, time for computation, temperature, malfunction, a production date, etc. of the processor, information indicating that the processor is required to be replaced may be displayed.

According to an embodiment, regarding a camera module included in the modular robot, when it is determined that the camera is required to be replaced by considering an operation time, frequency of photographing, the number of photographing cuts, malfunctions, a production date of a sensor included in the camera, etc., information indicating that the camera is required to be replaced may be displayed.

According to an embodiment, regarding a display included in the modular robot, when it is determined that the display is required to be replaced by considering an accumulated operation time, a production date, malfunction, temperature, etc. of the display, information indicating that the display is required to be replaced may be displayed.

According to an embodiment, regarding a battery included in the modular robot, when it is determined that the battery is required to be replaced by considering an accumulated amount of charge, an accumulated amount of discharge, State of Health (SoH), Depth of Discharge (DoD), a production date, malfunction, temperature, frequency of charge and discharge, frequency of full charge, etc., information indicating that the battery is required to be replaced may be displayed.

As such, the user terminal 100 analyzes a use pattern for various modules included in the modular robot adaptively to each module, so that a function of the modular robot can be performed in a combination of modules optimized and appropriate for a use pattern of the modular robot.

Figure 8:
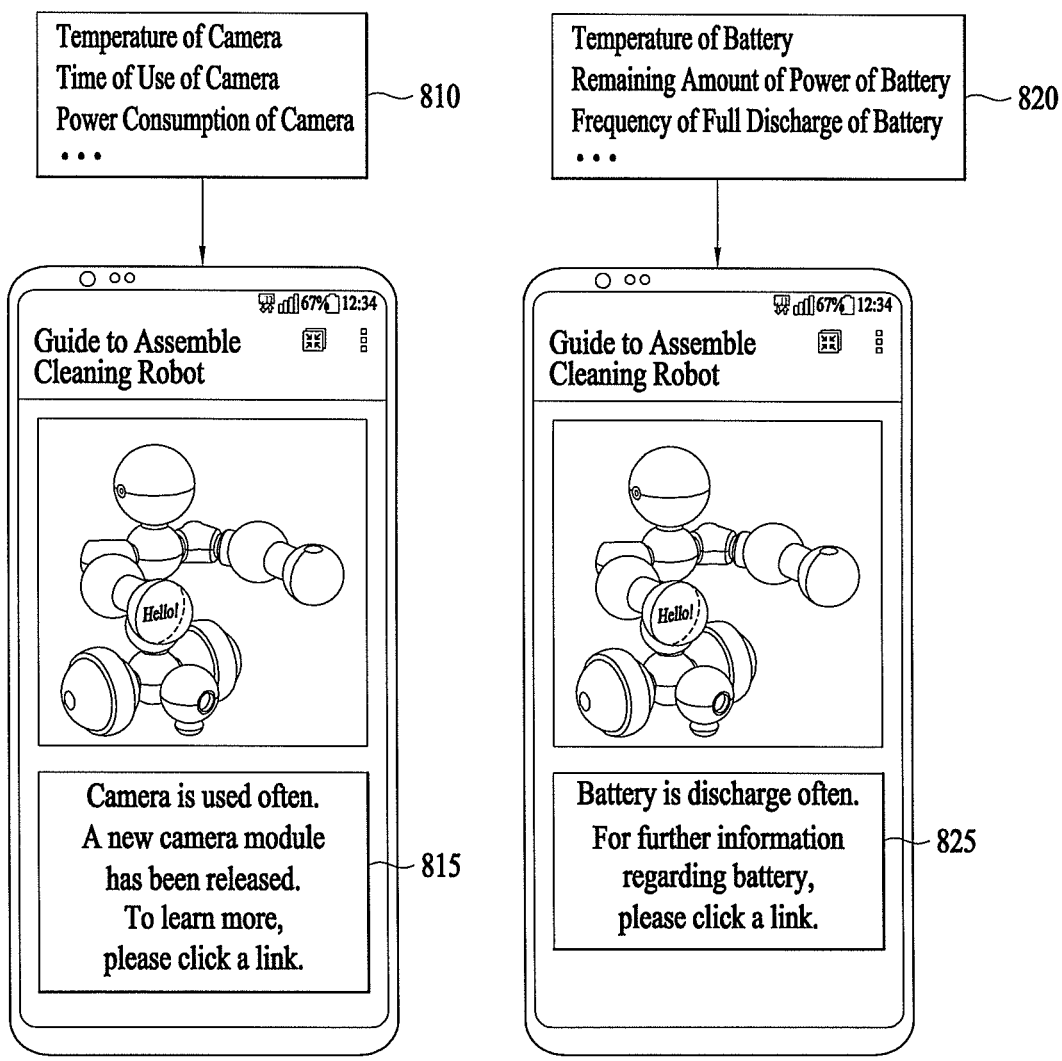
FIG. 8 shows an example in which a user terminal displays a module necessary to be repaired, based on a use pattern of a module mounted to a modular robot, according to an embodiment.

FIG. 8 shows an example in which a user terminal displays a module necessary to be repaired, based on a use pattern of a module mounted to a modular robot, according to an embodiment.

According to an embodiment, a user terminal 100 may receive information on a use pattern of a camera mounted to the modular robot (e.g., temperature of the camera, time of use of the camera, power consumption of the camera, etc.). When the received information on the use pattern of the camera is analyzed and thereby it is determined that the camera is required to be replaced, a processor 130 of the user terminal 100 may perform control so that information 815 indicating that the camera is required to be replaced is displayed on the display 120.

According to an embodiment, the user terminal 100 may receive information on a battery mounted to the modular robot (e.g., temperature of the battery, remaining capacity of the battery, frequency of full discharge of the battery, etc.). When the received information on the battery is analyzed and thereby it is determined that the battery is required to be replaced, the processor 130 of the user terminal 100 may perform control so that information indicating that the battery is required to be replaced can be displayed on the display 120.

According to an embodiment, the user terminal 100 may preset a weight for each module mountable to the modular robot. According to an embodiment, the preset weight is for a module mountable to the modular robot, and not just a weight for a module mounted to the modular robot, but also a weight for a module not mounted to the modular robot may be preset. According to an embodiment, the user terminal 100 may display need to remove a part of at least one module mounted to the modular robot, based on a weight for each module and power information of the modular robot. According to an embodiment, when it is determined that a remaining amount of power of the modular robot is equal to or smaller than a predetermined threshold based on the power information of the modular robot, the user terminal 100 may display need to remove a module having a low weight from among at least one module mounted to the modular robot. According to an embodiment, based on a use pattern of at least one module, when a remaining amount of power is equal to or smaller than a predetermined threshold, the user terminal 100 may display need to remove a module of which a frequency of use and a weight are low.

According to an embodiment, the user terminal 100 may preset a weight for a module allowed to be amounted to the modular robot, and may display information for recommending mounting of a module to be used together from among modules which have not been mounted based on a use pattern of at least one module mounted to the modular robot. According to an embodiment the information for recommending mounting of the module may be determined based on module combination information shared by another use. According to an embodiment, the user terminal 100 may determine weights for modules included in each combination indicated by the module combination information. According to an embodiment, the user terminal 100 may compare weights for modules mounted in the modular robot and weights for a combination indicated by the module combination information. Accordingly, even in a case where at least one module mounted to the modular robot is highly associated with the combination of modules, when it is determined that a module having a high weight is not mounted, the user terminal 100 may display information for recommending mounting of any module having a high weight from among modules which are not mounted to the modular robot.

According to an embodiment, the user terminal 100 may preset weights for modules in a form of a table consisting of the modules and the weights. According to an embodiment, information indicating the weighted value may be received from an outside or may be pre-stored.

Figure 9:
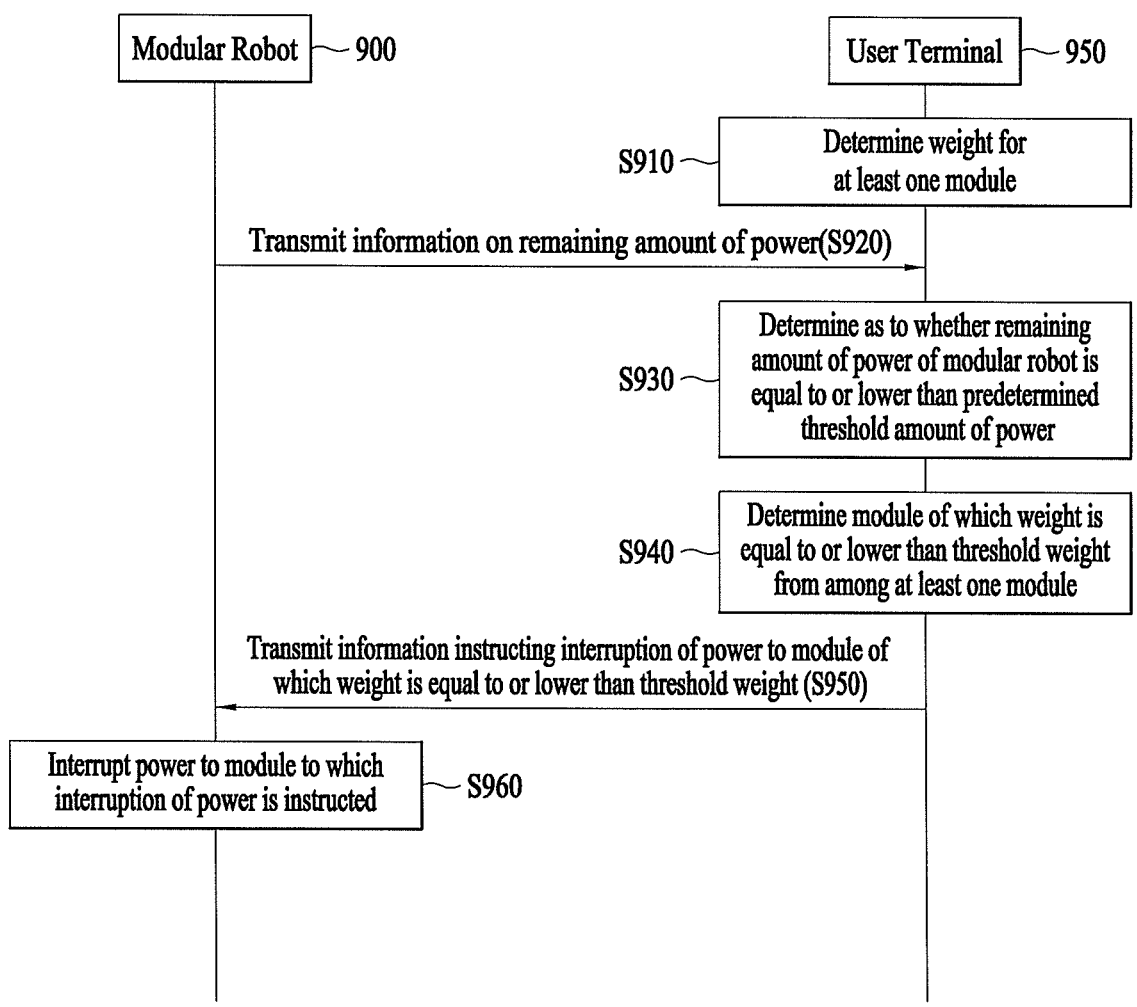
FIG. 9 shows a procedure in which a user terminal transmits information indicating interruption of power to a module of the modular robot based on whether a remaining amount of power of the modular robot is equal to or lower than a predetermined threshold amount of power, according to an embodiment.

FIG. 9 shows a procedure in which a user terminal 950 transmits information indicating interruption of power to a module of the modular robot based on whether a remaining amount of power of the modular robot is equal to or lower than a predetermined threshold amount of power, according to an embodiment. The user terminal 950 of FIG. 9 may correspond to the user terminal 100 of FIG. 1.

Referring to FIG. 9, in step S910, the user terminal 950 may preset a weight for at least one module according to an embodiment.

In step S920, the user terminal 950 may receive information on a remaining amount of power from a modular robot 900 according to an embodiment.

In step S930, the user terminal 950 may determine as to whether the remaining amount of power is equal to or lower than the predetermined threshold amount of power, based on the information on the remaining amount of power of the modular robot 900 which is received in the step S920.

In step S940, the user terminal 950 may determine which module has a weight equal to or lower than a predetermined threshold weight from among modules mounted to the modular robot 900 according to an embodiment.

In step S950, the user terminal 950 may transmit, to the modular robot 900, information that instructs interruption of power to a module of which a weight is equal to or lower than the predetermined threshold weight among the modules mounted to the modular robot 900 according to an embodiment.

In step S960, the modular robot 900 may interrupt power to the module to which interruption of power is instructed.

According to an embodiment, a weight for at least one module may be preset, and information instructing interruption of power to the at least one module may be transmitted to the modular robot based on a power state of the modular robot and the weight. Regarding this, the user terminal 100 may determine as to whether a remaining amount of power of the modular robot is equal to or lower than at least one threshold amount of power, and, when the remaining amount of power of the modular robot is equal to or lower than the at least one threshold amount of power, the user terminal 100 may transmit, to the modular robot, information instructing interruption of power to a module of which a weight is equal to or lower than a threshold weight assigned to the at least one threshold amount of power.

Figure 10:
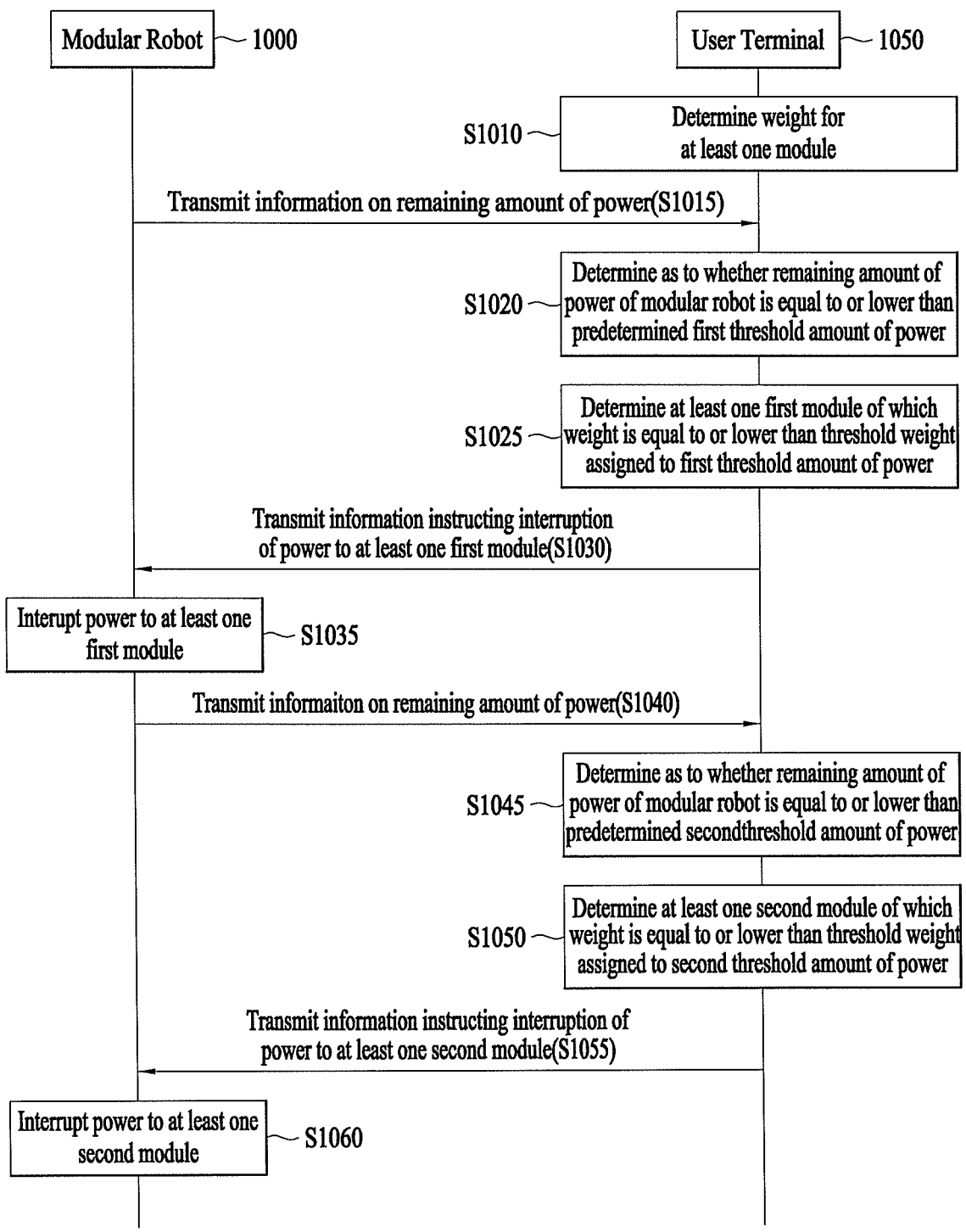
FIG. 10 shows a procedure in which a user terminal transmits information instructing interruption of power to a module of a modular robot based on whether a remaining amount of power of the modular robot is equal to or lower than at least one threshold amount of power.

FIG. 10 shows a procedure in which a user terminal 1050 transmits information instructing interruption of power to a module of a modular robot 1000 based on whether a remaining amount of power of the modular robot 1000 is equal to or lower than at least one threshold amount of power. The user terminal 1050 of FIG. 10 may correspond to the user terminal 100 of FIG. 1.

Referring to FIG. 10, in step S1010, the user terminal 1050 may preset a weight for at least one module.

In step S1015, the user terminal 1050 may receive information on a remaining amount of power from the modular robot 1000 according to an embodiment.

In step S1020, the user terminal 1050 may determine as to whether the remaining amount of power is equal to or lower than a predetermined first threshold amount of power based on the information on the remaining amount of power of the modular robot 1000, which is received in the step S1015.

In step S1025, the user terminal 1050 may determine at least one first module of which a weight is equal to or lower than a threshold weight assigned to the first threshold amount of power among modules mounted to the modular robot 1000, according to an embodiment.

In step S1030, the user terminal 1050 may transmit, to the modular robot 1000, information instructing interruption of power to the at least one first module mounted to the modular robot 1000 according to an embodiment.

In step S1035, the modular robot 1000 may interrupt power to the at least one first module to which interruption of power is instructed.

In step S1040, the user terminal 1050 may receive information on a remaining amount of power from the modular robot 1000 according to an embodiment. According to an embodiment, the remaining amount of power of the modular robot 1000 may be reduced even after the power to the at least one first module is interrupted. In this case, the remaining amount of power of the modular robot 1000 may be reduced to a value equal to or lower than a second threshold amount of power lower than the first threshold amount of power.

In step S1045, the user terminal 1050 may determine as to whether the remaining amount of power is equal to or lower than the predetermined second threshold amount of power based on the information on the remaining amount of power of the modular robot 1000, which is received in the step S1040.

In step S1050, the user terminal 1050 may determine at least one second module of which a weight is equal to or lower than a threshold weight assigned to the second threshold amount of power from among modules mounted to the modular robot 1000 according to an embodiment. According to an embodiment, the threshold weight assigned to the second threshold amount of power may have a value higher than a threshold weight assigned to the first threshold amount of power.

In step S1055, the user terminal 1050 may transmit, to the modular robot 1000, information instructing interruption of power to at least one second module mounted to the modular robot 1000 according to an embodiment.

In step S1060, the modular robot 1000 may interrupt power to the at least one second module to which interruption of power is instructed. Accordingly, depending to a degree by which the remaining amount of power of the modular robot 1000 is reduced, the user terminal 1050 may interrupt power to modules in order from a lower weight, and therefore, the user terminal 1050 is able to manage power of the modular robot 1000 efficiently. According to an embodiment, the user terminal 1050 does not interrupt power to a module of which a weight is equal to or higher than a predetermined threshold weight, and thus, the user terminal 1050 may efficiently manage power and does not obstruct a function of the modular robot at the same time.

Figure 11:
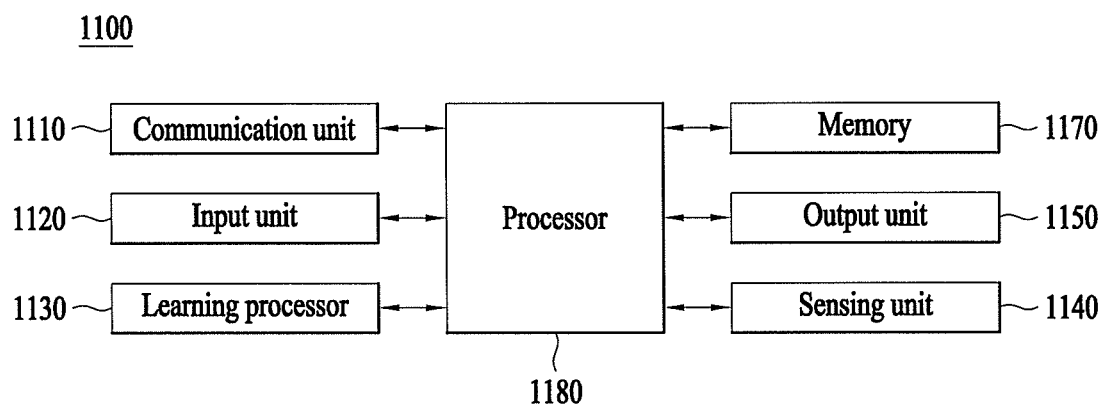
FIG. 11 shows an Artificial Intelligence (AI) device according to an embodiment.

FIG. 11 illustrates an AI device according to an embodiment of the present disclosure. Other embodiments and configurations may also be provided.

AI device 1100 of FIG. 11 may correspond to the user terminal 100 of FIG. 1, and some of constituent elements of FIG. 11, which are not included in the user terminal 100 of FIG. 1, may be selectively adopted within a range in which embodiments of the present disclosure may be realized.

AI device 1100 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, or a vehicle.

Referring to FIG. 11, AI device 1100 may include a communication unit 1110 (or communication device), an input unit 1120 (or input device), a learning processor 1130, a sensing unit 1140 (or sensing device), an output unit 1150 (or output device), a memory 1170, and a processor 1180, for example.

Communication unit 1110 may transmit and receive data to and from external devices, such as other AI devices 1300$a$ to 1300$e$ and an AI server 1200, using wired/wireless communication technologies. For example, communication unit 1110 may transmit and receive sensor information, user input, learning models, and/or control signals, for example, to and from external devices.

The communication technology used by communication unit 1110 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

Input unit 1120 may acquire various types of data.

Input unit 1120 may include a camera for the input of an image signal, a microphone for receiving an audio signal, and a user input unit for receiving information input by a user, for example. The camera or the microphone may be handled as a sensor, and a signal acquired from the camera or the microphone may be referred to as sensing data or sensor information.

Input unit 1120 may acquire, for example, input data to be used when acquiring an output using learning data for model learning and a learning model. Input unit 1120 may acquire unprocessed input data, and processor 1180 or learning processor 1130 may extract an input feature as pre-processing for the input data.

Learning processor 1130 may cause a model configured with an artificial neural network to learn using the learning data. The learned artificial neural network may be called a learning model. The learning model may be used to deduce a result value for newly input data other than the learning data, and the deduced value may be used as a determination base for performing any operation.

Learning processor 1130 may perform AI processing along with a learning processor 1240 of AI server 1200.

Learning processor 1130 may include a memory integrated or embodied in AI device 1100. Alternatively, learning processor 1130 may be realized using memory 1170, an external memory directly coupled to AI device 1100, or a memory held in an external device.

Sensing unit 1140 (or sensing device) may acquire at least one of internal information of AI device 1100, environmental information around AI device 1100, and user information using various sensors.

The sensors included in sensing unit 1140 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar, and/or a temperature sensor, for example.

Output unit 1150 (or output device) may generate, for example, a visual output, an auditory output, and/or a tactile output.

Output unit 1150 may include, for example, a display that outputs visual information, a speaker that outputs auditory information, and/or a haptic module that outputs tactile information.

Memory 1170 may store data which assists various functions of AI device 1100. For example, memory 1170 may store input data acquired by input unit 1120, learning data, learning models, and learning history, for example.

Processor 1180 may determine at least one executable operation of AI device 1100 based on information determined or generated using a data analysis algorithm or a machine learning algorithm. Processor 1180 may control constituent elements of AI device 1100 to perform the determined operation.

Processor 1180 may request, search, receive, or utilize data of learning processor 1130 or memory 1170, and may control the constituent elements of AI device 1100 so as to execute a predictable operation or an operation that is deemed desirable among the at least one executable operation.

When connection of an external device is required to perform the determined operation, processor 1180 may generate a control signal for controlling the external device and may transmit the generated control signal to the external device.

Processor 1180 may acquire (or obtain) intention information with respect to user input and may determine a user request based on the acquired intention information.

Processor 1180 may acquire intention information corresponding to the user input using at least one of a speech to text (STT) engine for converting voice input into a character string and a natural language processing (NLP) engine for acquiring natural language intention information.

At least a part of the STT engine and/or the NLP engine may be configured with an artificial neural network learned according to a machine learning algorithm. The STT engine and/or the NLP engine may have learned by learning processor 1130, may have learned by learning processor 1240 of AI server 1200, or may have learned by distributed processing of these processors.

Processor 1180 may collect history information including, for example, content of an operation of AI device 1100 or feedback of the user with respect to an operation, and may store the collected information in memory 1170 or learning processor 1130, or may transmit the collected information to an external device such as AI server 1200. The collected history information may be used to update a learning model.

Processor 1180 may control at least some of the constituent elements of AI device 1100 in order to drive an application program stored in memory 1170. Processor 1180 may combine and operate two or more of the constituent elements of AI device 1100 for the driving of the application program.

Figure 12:
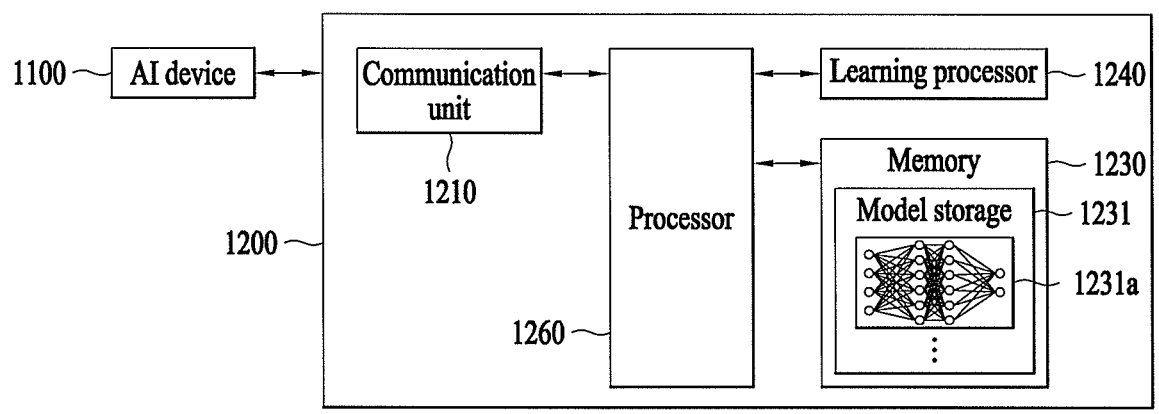
FIG. 12 shows an AI server according to an embodiment.

FIG. 12 illustrates AI server 1200 according to an embodiment of the present disclosure. Other embodiments and configurations may also be provided.

Referring to FIG. 12, AI server 1200 may refer to a device that causes an artificial neural network to learn using a machine learning algorithm or uses the learned artificial neural network. AI server 1200 may be constituted of multiple servers to perform distributed processing, and may be defined as a 5G network. AI server 1200 may be included as a constituent element of AI device 1100 so as to perform at least a part of AI processing together with the AI device.

AI server 1200 may include a communication unit 1210 (or communication device), a memory 1230, learning processor 1240, and a processor 260, for example.

Communication unit 1210 may transmit and receive data to and from an external device such as AI device 1100.

Memory 1230 may include a model storage unit 1231 (or model storage device). Model storage unit 1231 may store a model (or an artificial neural network) 1231*a* which is learning or has learned via learning processor 1240.

Learning processor 1240 may cause artificial neural network 1231*a* to learn learning data. A learning model may be used in the state of being provided (or mounted) in AI server 1200 of the artificial neural network, or may be used in the state of being provided (or mounted) in an external device such as AI device 1100.

The learning model may be realized in hardware, software, or a combination of hardware and software. When a part or the entirety of the learning model is realized in software, one or more instructions constituting the learning model may be stored in memory 1230.

Processor 1260 may deduce a result value for newly input data using the learning model, and may generate a response or a control instruction based on the deduced result value.

Figure 13:
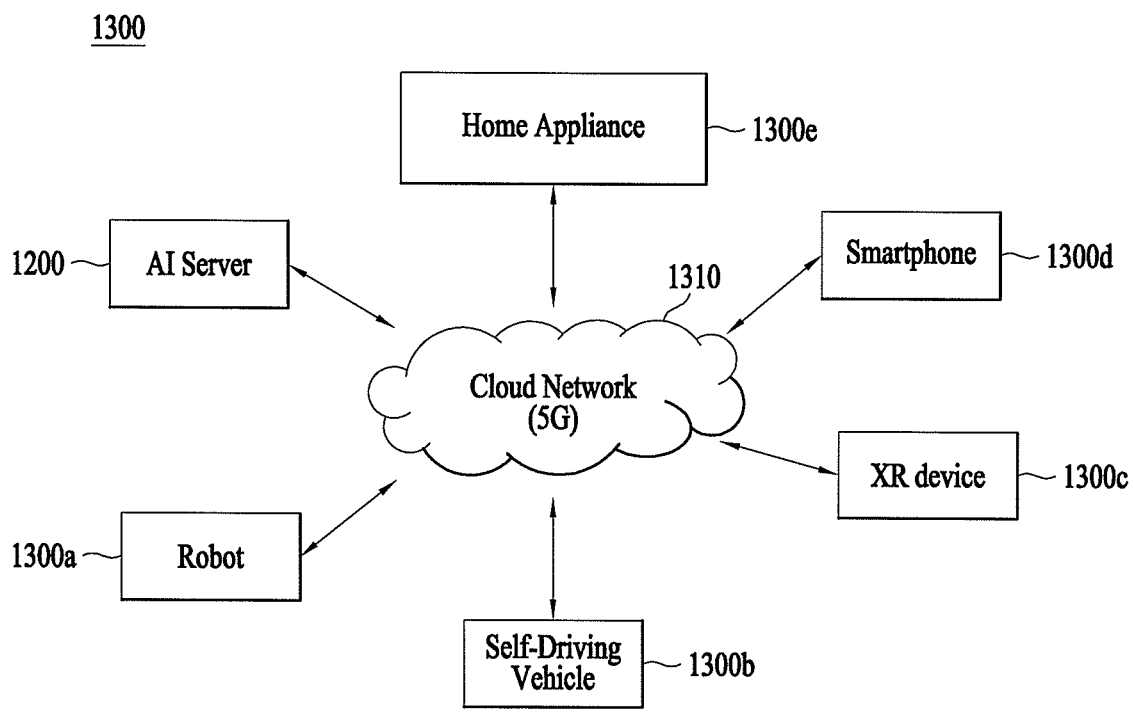
FIG. 13 shows an AI system according to an embodiment.

FIG. 13 illustrates an AI system 1300 according to an embodiment of the present disclosure. Other embodiments and configurations may also be provided.

Referring to FIG. 13, in AI system 1300, at least one of AI server 1200, a robot 1300*a*, an autonomous vehicle 1300*b*, an XR device 1300*c*, a smart phone 1300*d*, and a home appliance 1300*e* is connected to a cloud network 1310. Here, robot 1300*a*, autonomous vehicle 1300*b*, XR device 1300*c*, smart phone 1300*d*, and home appliance 1300*e*, to which AI technologies are applied, may be referred to as AI devices 1300*a* to 1300*e*.

Cloud network 1310 may constitute a part of a cloud computing infra-structure, or may refer to a network present in the cloud computing infra-structure. Cloud network 1310 may be configured using a 3G network, a 4G or long term evolution (LTE) network, or a 5G network, for example.

Respective devices 1300*a* to 1300*e* and 1200 constituting AI system 1300 may be connected to each other via cloud network 1310. More particularly, respective devices 1300*a* to 1300*e* and 1200 may communicate with each other via a base station, and/or may perform direct communication without the base station.

AI server 1200 may include a server which performs AI processing and a server which performs an operation with respect to big data.

AI server 1200 may be connected to at least one of robot 1300*a*, autonomous vehicle 1300*b*, XR device 1300*c*, smart phone 1300*d*, and home appliance 1300*e*, which are AI devices constituting AI system 1300, via cloud network 1310, and may assist at least a part of AI processing of connected AI devices 1300*a* to 1300*e*.

Rather than AI devices 1300*a* to 1300*e*, AI server 1200 may cause an artificial neural network to learn according to a machine learning algorithm, and may directly store a learning model or may transmit the learning model to AI devices 1300*a* to 1300*e*.

AI server 1200 may receive input data from AI devices 1300*a* to 1300*e*, may deduce a result value for the received input data using the learning model, and may generate a response or a control instruction based on the deduced result value to transmit the response or the control instruction to AI devices 1300*a* to 1300*e*.

Alternatively, AI devices 1300*a* to 1300*e* may directly deduce a result value with respect to input data using the learning model, and may generate a response or a control instruction based on the deduced result value.

Various embodiments of AI devices 1300a to 1300e, to which the above-described technology is applied, may be described. AI devices 1300a to 1300e shown in FIG. 13 may be specific embodiments of AI device 1100 shown in FIG. 11.

Robot 1300a may be realized into a guide robot, a transportation robot, a cleaning robot, a wearable robot, an entertainment robot, a pet robot, or an unmanned flying robot, for example, through the application of AI technologies.

Robot 1300a may include a robot control module for controlling an operation, and the robot control module may refer to a software module or a chip realized in hardware.

Robot 1300a may acquire (or obtain) information on the state of robot 1300a using sensor information acquired from various types of sensors, may detect (recognize) the surrounding environment and an object, may generate map data, may determine a movement route and a driving plan, may determine a response with respect to user intersection, and/or may determine an operation.

Robot 1300a may use sensor information acquired from at least one sensor among a lidar, a radar, and a camera in order to determine a movement route and a driving plan.

Robot 1300a may perform the above-described operations using a learning model configured with at least one artificial neural network. For example, robot 1300a may recognize the surrounding environment and the object using the learning model, and may determine an operation using the recognized surrounding environment information or object information. The learning model may be directly learned in robot 1300a, and/or may be learned in an external device such as AI server 1200.

Robot 1300a may directly generate a result using the learning model to perform an operation, but may transmit sensor information to an external device such as AI server 1200 and receive a result generated by the external device to perform an operation.

Robot 1300a may determine a movement route and a driving plan using at least one of map data, object information detected from sensor information, and object information acquired from an external device, and a drive unit (or drive device) may be controlled to drive robot 1300a according to the determined movement route and driving plan.

The map data may include object identification information for various objects arranged in a space along which robot 1300a moves. For example, the map data may include object identification information for stationary objects, such as the wall and the door, and movable objects such as a flowerpot and a desk. The object identification information may include names, types, distances, and locations, for example.

Robot 1300a may perform an operation or may drive by controlling the drive unit based on user control or interaction. Robot 1300a may acquire interactional intention information depending on a user operation or voice expression, and may determine a response based on the acquired intention information to perform an operation.

Autonomous vehicle 1300b may be realized into a mobile robot, a vehicle, or an unmanned air vehicle, for example, through application of AI technologies.

Autonomous vehicle 1300b may include an autonomous driving control module for controlling an autonomous driving function, and the autonomous driving control module may mean a software module or a chip realized in hardware. The autonomous driving control module may be a constituent element included in autonomous vehicle 1300b, but may be a separate hardware element outside autonomous vehicle 1300b so as to be connected thereto.

Autonomous vehicle 1300b may acquire information on the state of autonomous vehicle 1300b using sensor information acquired from various types of sensors, may detect (recognize) the surrounding environment and an object, may generate map data, may determine a movement route and a driving plan, or may determine an operation.

Autonomous vehicle 1300b may use sensor information acquired from at least one sensor among a lidar, a radar, and a camera in the same manner as robot 1300a in order to determine a movement route and a driving plan.

Autonomous vehicle 1300b may recognize the environment or an object with respect to an area outside the field of vision or an area located at a predetermined distance or more by receiving sensor information from external devices, or may directly receive recognized information from external devices.

Autonomous vehicle 1300b may perform the above-described operations using a learning model configured with at least one artificial neural network. For example, autonomous vehicle 1300b may recognize the surrounding environment and the object using the learning model, and may determine a driving line using the recognized surrounding environment information or object information. The learning model may be directly learned in autonomous vehicle 1300b, or may be learned in an external device such as AI server 1200.

Autonomous vehicle 1300b may generate a result using the learning model to perform an operation, but may transmit sensor information to an external device such as AI server 1200 and receive a result generated by the external device to perform an operation.

Autonomous vehicle 1300b may determine a movement route and a driving plan using at least one of map data, object information detected from sensor information, and object information acquired from an external device, and a drive unit (or driving device) may be controlled to drive autonomous vehicle 1300b according to the determined movement route and driving plan.

The map data may include object identification information for various objects arranged in a space (e.g., a road) along which autonomous vehicle 1300b drives. For example, the map data may include object identification information for stationary objects, such as streetlights, rocks, and buildings, and movable objects such as vehicles and pedestrians. The object identification information may include names, types, distances, and locations, for example.

Autonomous vehicle 1300b may perform an operation or may drive by controlling the drive unit based on user control or interaction. Autonomous vehicle 1300b may acquire interactional intention information depending on a user operation or voice expression, and may determine a response based on the acquired intention information to perform an operation.

XR device 1300c may be realized into a head-mount display (HMD), a head-up display (HUD) provided in a vehicle, a television, a cellular phone, a smart phone, a computer, a wearable device, a home appliance, a digital signage, a vehicle, a stationary robot, and/or a mobile robot, for example, through application of AI technologies.

XR device 1300c may obtain information on the surrounding space or a real object by analyzing three-dimensional point cloud data or image data acquired from various sensors or an external device to generate positional data and attribute data for three-dimensional points, and may output an XR object by rendering the XR object to be output. For example, XR device 1300c may output an XR object including additional information about a recognized object so as to correspond to the recognized object.

XR device 1300c may perform the above-described operations using a learning model configured with at least one artificial neural network. For example, XR device 1300c may recognize a real object from three-dimensional point cloud data or image data using a learning model, and may provide information corresponding to the recognized real object. The learning model may be directly learned in XR device 1300c, and/or may be learned in an external device such as AI server 1200.

XR device 1300c may directly generate a result using the learning model to perform an operation, but may transmit sensor information to an external device such as AI server 1200 and receive the generated result to perform an operation.

Robot 1300a may be realized into a guide robot, a transportation robot, a cleaning robot, a wearable robot, an entertainment robot, a pet robot, and/or an unmanned flying robot, for example, through application of AI technologies and autonomous driving technologies.

Robot 1300a to which the AI technologies and the autonomous driving technologies are applied may refer to, for example, a robot having an autonomous driving function, and/or may refer to robot 1300a which interacts with autonomous vehicle 1300b.

Robot 1300a having an autonomous driving function may collectively refer to devices that move by themselves along a given moving line without user control, and/or move by determining a moving line by themselves.

Robot 1300a and autonomous vehicle 1300b, which have an autonomous driving function, may use a common sensing method in order to determine at least one of a movement route or a driving plan. For example, robot 1300a and autonomous vehicle 1300b, which have an autonomous driving function, may determine at least one of the movement route or the driving plan using information sensed by a lidar, a radar, and a camera.

Robot 1300a, which interacts with autonomous vehicle 1300b, may be provided separately from autonomous vehicle 1300b so as to be connected to the autonomous driving function of autonomous vehicle 1300b inside or outside autonomous vehicle 1300b, and/or may perform an operation associated with a user who has got on autonomous vehicle 1300b.

Robot 1300a, which interacts with autonomous vehicle 1300b, may acquire sensor information instead of autonomous vehicle 1300b to provide the information to autonomous vehicle 1300b, and/or may acquire sensor information and generate surrounding environment information or object information to provide the information to autonomous vehicle 1300b, thereby controlling or assisting the autonomous driving function of autonomous vehicle 1300b.

Alternatively, robot 1300a, which interacts with autonomous vehicle 1300b, may monitor the user who has got on autonomous vehicle 1300b or may control functions of autonomous vehicle 1300b via interaction with the user. For example, when it is determined that a driver is in a drowsy state, robot 1300a may activate the autonomous driving function of autonomous vehicle 1300b and/or may assist the control of a drive unit of autonomous vehicle 1300b. The functions of autonomous vehicle 1300b controlled by robot 1300a may include not only the autonomous driving function, but also a function provided in a navigation system or an audio system provided in autonomous vehicle 1300b.

Alternatively, robot 1300a, which interacts with autonomous vehicle 1300b, may provide information to autonomous vehicle 1300b and/or assist the function thereof at the outside of autonomous vehicle 1300b. For example, robot 1300a may serve as a smart traffic light that provides traffic information including, for example, traffic signal information to autonomous vehicle 1300b, and/or may serve as an automatic electric charger of an electric vehicle that may interact with autonomous vehicle 1300b and may be automatically connected to a charge port of the vehicle.

Robot 1300a may be realized into a guide robot, a transportation robot, a cleaning robot, a wearable robot, an entertainment robot, a pet robot, an unmanned flying robot, or a drone, for example, through application of AI technologies and XR technologies.

Robot 1300a, to which the XR technologies are applied, may refer to a robot which is a control or interaction target in an XR image. Robot 1300a may be provided separately from XR deice 1300c and may operate in cooperation with XR device 1300c.

When robot 1300a, which is a control or interaction target in an XR image, acquires sensor information from sensors including a camera, robot 1300a or XR device 1300c may generate an XR image based on the sensor information, and XR device 1300c may output the generated XR image. Such robot 1300a may operate based on a control signal input through XR device 1300c or via intersection with the user.

For example, the user may check the XR image corresponding to the viewpoint of robot 1300a, which is remotely linked, via an external device such as XR device 1300c, and may adjust an autonomous driving route of robot 1300a and/or control an operation or driving thereof via interaction with the robot, and/or may check information on an object around thereof.

Autonomous vehicle 1300b may be realized into a mobile robot, a vehicle, or an unmanned air vehicle, for example, through application of the AI technologies and the XR technologies.

Autonomous vehicle 1300b, to which the XR technologies are applied, may refer to an autonomous vehicle having an XR image providing device, or may refer to an autonomous vehicle as a control or interaction target in an XR image, for example. More particularly, autonomous vehicle 1300b as a control or interaction target in an XR image may be provided separately from XR device 1300c and may operate in cooperation with XR device 1300c.

Autonomous vehicle 1300b having the XR image providing device may acquire sensor information from sensors including a camera, and may output an XR image generated based on the acquired sensor information. For example, autonomous vehicle 1300b may include an HUD to output an XR image, thereby providing an occupant with an XR object corresponding to a real object or an object in the screen.

At this time, when the XR object is output to the HUD, at least a portion of the XR object may be output so as to overlap with a real object to which the passenger's gaze is directed. On the other hand, when the XR object is output to a display provided in autonomous vehicle 1300b, at least a portion of the XR object may be output so as to overlap with an object in the screen. For example, autonomous vehicle 1300b may output XR objects corresponding to objects such as a lane, another vehicle, a traffic light, a traffic sign, a two-wheeled vehicle, a pedestrian, and a building.

When autonomous vehicle 1300b as a control or interaction target in an XR image acquires sensor information from sensors including a camera, autonomous vehicle 1300b or XR device 1300c may generate an XR image based on the sensor information, and XR device 1300c may output the generated XR image. Autonomous vehicle 1300b may operate based on a control signal input through an external device such as XR device 1300c or via interaction with the user.

The above-described method according to the present disclosure may be provided as a program to be executed in a computer and be recorded on a computer readable recording medium.

The method of the present disclosure may be executed via software. When executed via software, constituent elements of the present disclosure are code segments that execute required operations. The program or the code segments may be stored in a processor readable medium.

The computer readable recording medium includes all kinds of recording devices in which data is stored in a computer readable manner. Examples of the computer readable recording device include a ROM, a RAM, a CD-ROM, a DVD-ROM, a DVD-RAM, a magnetic tape, a floppy disc, a hard disc, and an optical data storage device. Additionally, the computer readable recording device may be distributed in a computer device connected thereto via a network so that a computer readable code may be stored and executed in a distribution manner.

The present disclosure is devised to enable a robot to efficiently perform a charging process only for a time effective for prevention of aging of a battery while the robot is not operating in order not to substantially disturb an operation of the robot.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for managing a modular robot, mounting at least one module, using a user terminal, the method comprising:
    acquiring mount information on the at least one module mounted to the modular robot;
    receiving module information on a module corresponding to the mount information;
    displaying at least one of the mount information or the module information;
    determining a weight value for a priority of the at least one module; and
    displaying information indicating need to remove a part of the at least one module based on the weight value for the at least one module, wherein the part of the at least one module has a lower weight value than another module among the at least one module.

2. The method of claim 1, wherein the module information comprises at least one of information on the at least one module or information on a function of the at least one module.

3. The method of claim 1, further comprising:
    receiving module combination information indicating a combination of modules mountable to the modular robot; and
    displaying the received module combination information.

4. The method of claim 3, wherein the displaying of the at least one of the mount information or the module information further comprises displaying recommended module information indicating a module that is determined to be additionally necessary for the modular robot based on the module combination, the mount information, and the module information.

5. The method of claim 4, wherein the displaying of the recommended module information comprises:
    displaying a first object for ordering the module that is determined to be additionally necessary; and
    when the first object is selected, displaying a screen for ordering a module corresponding to the first object.

6. The method of claim 5, further comprising, when the module determined to be additionally necessary is ordered, displaying a second object indicating that the module is ordered.

7. The method of claim 3, further comprising selecting one of combinations of modules mountable to the modular robot, and displaying a guide for mounting at least one module corresponding to the selected combination.

8. The method of claim 7, wherein the displaying of the guide comprises:

based on the mount information, determining a module that has not been mounted among the at least one module corresponding to the selected combination; and displaying a guide for mounting the module that is determined to have not been mounted.

9. The method of claim 1, further comprising displaying a module that is required to be replaced among the at least one module based on information on a use pattern of the modular robot.

10. The method of claim 9, wherein the information on the use pattern is acquired in a manner in which the information on the use pattern is discriminated with respect to each type of the at least one module.

11. The method of claim 1,
wherein the displaying of the information includes displaying the information indicating need to remove a part of the at least one module based on a power state of the modular robot and the weight value.

12. The method of claim 1, further comprising:
transmitting, to the modular robot, information instructing interruption of power to the at least one module based on a power state of the modular robot and the weight value.

13. The method of claim 12, wherein the transmitting of the information instructing interruption of power to the at least one module comprises;
determining as to whether a remaining amount of power of the modular robot is equal to or lower than a predetermined threshold amount of power; and
when it is determined that the remaining amount of power is equal to or lower than the predetermined threshold amount of power, transmitting, to the modular robot, information instructing interruption of power to the at least one module of which the weight value is equal to or lower than a threshold weight value.

14. The method of claim 12, wherein the transmitting of the information instructing interruption of power to the at least one module comprises:
determining as to whether a remaining amount of power of the modular robot is equal to or lower than at least one threshold amount of power; and
when the remaining amount of power is equal to or lower than the at least one threshold amount of power, transmitting, to the modular robot, information instructing interruption of power to a module of which a weight value is equal to or lower than a threshold weight value assigned for each of the at least one threshold amount of power.

15. The method of claim 1, wherein the acquiring of the mount information comprises:
photographing the modular robot; and
acquiring the mount information by identifying the at least one module mounted to the modular robot based on a photographed image.

16. The method of claim 15, wherein the acquiring of the mount information comprises acquiring the mount information by identifying at least one of a barcode or a QR code attached to the at least one module.

17. The method of claim 1, further comprising:
determining as to whether an abnormally operating module is included in the at least one module; and
when an abnormally operating module is included in the at least one module, displaying a warning message about the abnormally operating module.

18. The method of claim 1, further comprising acquiring a frequency of use of the at least one module amounted to the modular robot, and displaying information indicating need to remove a module, among the at least one module, of which the frequency of use is equal to or lower than a predetermined threshold frequency.

19. A user terminal for managing a modular robot mounting at least one module, comprising:
a communication unit;
a display; and
a processor configured to
acquire mount information on the at least one module mounted to the modular robot,
control the communication unit to receive module information on a module corresponding to the mount information,
control the display to display at least one of the mount information or the module information, determine a weight value for a priority of the at least one module, and
display information indicating need to remove a part of the at least one module based on the weight value for the at least one module,
wherein the part of the at least one module has a lower weight value than another module among the at least one module.

20. A non-volatile computer readable recording medium in which a computer program for implementing the method of claim 1 is recorded.

* * * * *